US006994082B2

(12) United States Patent
Hochberg et al.

(10) Patent No.: US 6,994,082 B2
(45) Date of Patent: Feb. 7, 2006

(54) LIGHTWEIGHT, LOW-COST SOLAR ENERGY COLLECTOR

(76) Inventors: Eric B. Hochberg, 3737 Canyon Crest Rd., Altadena, CA (US) 91001; Michael K. Costen, 58 Ridge St., Milford, CT (US) 06460

( * ) Notice: Subject to any disclaimer, the term of this patent is extended or adjusted under 35 U.S.C. 154(b) by 0 days.

(21) Appl. No.: 10/601,923

(22) Filed: Jun. 19, 2003

(65) Prior Publication Data

US 2004/0055594 A1  Mar. 25, 2004

Related U.S. Application Data

(60) Provisional application No. 60/412,518, filed on Sep. 20, 2002.

(51) Int. Cl.
*F24J 2/10* (2006.01)
(52) U.S. Cl. .................. 126/696; 126/694; 126/705
(58) Field of Classification Search ................ 126/696, 126/694, 704, 710, 705, 651, 652, 654, 600, 126/675, 674, 634
See application file for complete search history.

(56) References Cited

U.S. PATENT DOCUMENTS

| | | | |
|---|---|---|---|
| 4,051,834 A | | 10/1977 | Fletcher et al. |
| 4,071,017 A | | 1/1978 | Russell, Jr. et al. |
| 4,077,392 A | | 3/1978 | Garner |
| 4,129,119 A | * | 12/1978 | Yoke .......................... 126/694 |
| 4,173,397 A | | 11/1979 | Simpson |
| 4,243,019 A | | 1/1981 | Severson |
| 4,291,677 A | | 9/1981 | Monk |
| 4,293,192 A | | 10/1981 | Bronstein |
| 4,296,738 A | * | 10/1981 | Kelton ........................ 126/656 |
| 4,312,327 A | * | 1/1982 | Marshall et al. ............. 126/694 |
| 4,318,394 A | | 3/1982 | Alexander |
| 4,359,041 A | | 11/1982 | Snodgrass |
| 4,432,342 A | | 2/1984 | Lucas et al. |
| 4,454,371 A | | 6/1984 | Folino |
| 4,511,215 A | * | 4/1985 | Butler ......................... 359/847 |
| 4,515,148 A | | 5/1985 | Boy-Marcotte et al. |
| 4,820,033 A | * | 4/1989 | Sick ............................ 359/852 |
| 4,920,033 A | | 4/1990 | Cress |
| 5,365,920 A | * | 11/1994 | Lechner ....................... 126/696 |

FOREIGN PATENT DOCUMENTS

JP        2003-329963 A   * 11/2003

* cited by examiner

*Primary Examiner*—Josiah C. Cocks
(74) *Attorney, Agent, or Firm*—Dauphin Law Offices; Brian C. Dauphin

(57) ABSTRACT

A lightweight solar concentrator of the reflecting parabolic or trough type is realized via a thin reflecting film, an inflatable structural housing and tensioned fibers. The reflector element itself is a thin, flexible, specularly-reflecting sheet or film. The film is maintained in the parabolic trough shape by means of a plurality of identical tensioned fibers arranged to be parallel to the longitudinal axis of the parabola. Fiber ends are terminated in two identical spaced anchorplates, each containing a plurality of holes which lie on the desired parabolic contour. In a preferred embodiment, these fibers are arrayed in pairs with one fiber contacting the front side of the reflecting film and the other contacting the back side of the reflecting film. The reflective surface is thereby slidably captured between arrays of fibers which control the shape and position of the reflective film. Gas pressure in the inflatable housing generates fiber tension to achieve a truer parabolic shape.

16 Claims, 11 Drawing Sheets

LIGHTWEIGHT, LOW-COST SOLAR ENERGY COLLECTOR

CROSS-REFERENCE TO CORRESPONDING APPLICATIONS

This application takes priority from provisional patent application Ser. No. 60/412,518 filed on Sep. 20, 2002.

ORIGIN OF THE INVENTION

The invention described herein was made in the performance of work under a NASA contract, and is subject to the provisions of public law 96-517 (35 USC 202) in which the contractor has elected to retain title.

BACKGROUND OF THE INVENTION

1. Technical Field

The present invention relates generally to the field of solar collectors having a parabolic trough to collect and concentrate the solar energy. The invention pertains more specifically to an extremely lightweight and low cost parabolic trough solar collector.

2. Background Art

Parabolic trough technology is currently the most advanced solar thermal electric generating technology. This is primarily due to nine large commercial-scale solar power plants, the first of which has been operating in the California Mojave Desert since 1984. These plants, which continue to operate on a daily basis, range in size from 14 to 80 MW and represent a total of 354 MW of installed electric generating capacity. Large fields of parabolic trough collectors supply the thermal energy used to produce steam for a Rankine steam turbine/generator cycle.

The collector field consists of a large field of single-axis tracking parabolic trough solar collectors. The solar field is modular in nature and is composed of many parallel rows of solar collectors aligned on a north-south horizontal axis. Each solar collector has a linear parabolic-shaped reflector that concentrates the sun's direct beam radiation on a linear receiver located at the focus of the parabola. The collectors track the sun from east to west during the day to ensure that the sun is continuously focused on the linear receiver. A heat transfer fluid (HTF) is heated as it circulates through the receiver and returns to a series of heat exchangers in the power block where the fluid is used to generate high-pressure superheated steam. The superheated steam is then fed to a conventional reheat steam turbine/generator to produce electricity. Other solar concentrators convert the energy at the receiver directly into electricity via photovoltaic cells. There are unlimited uses of the energy concentrated on the receiver.

Exploitation of radiant solar energy is limited by the cost of the collection and conversion apparatus. To harvest substantial quantities of radiant solar energy requires substantial collection area which typically translates to substantial cost for both the collection and conversion apparatus. Reducing the cost of large area collectors motivates this invention.

The following issued U.S. Patents appear to constitute relevant prior art:

| U.S. PAT. NO. | PATENT DATE | INVENTOR |
| --- | --- | --- |
| 4,173,397 | Nov. 6, 1979 | Simpson |
| 4,432,342 | Feb. 21, 1984 | Lucas |
| 4,051,834 | Oct. 4, 1977 | Fletcher |
| 4,318,394 | Mar. 9, 1982 | Alexander |
| 4,071,017 | Jan. 31, 1978 | Russell |
| 4,920,033 | Apr. 11, 1989 | Sick |
| 4,243,019 | Jan. 6, 1981 | Severson |
| 4,454,371 | Jun. 12, 1984 | Folino |
| 4,077,392 | Mar. 7, 1978 | Garner |
| 4,515,148 | May 7, 1985 | Boy-Marcotte |
| 4,359,041 | Nov. 16, 1982 | Snodgrass |
| 4,293,192 | Oct. 6, 1981 | Bronstein |
| 4,291,677 | Sep. 29, 1981 | Monk |

Of the foregoing prior art patents, the patents to Russell (U.S. Pat. No. 4,071,017) and to Simpson (U.S. Pat. No. 4,137,397) appear to be the most relevant.

Russell discloses a tensioned reflector support structure in which individual reflector planar slats are made independently moveable to focus reflected sunlight on a common receiver. The relevance results from the structure of each slat which employs tensioned cable pairs and a thin reflective sheet to form each slat mirror.

Simpson discloses a parabolic reflector sheet that is placed in tension against a plurality of tensioned wires to form the parabolic shape. Support bars are used to force the reflector against the wires.

Neither of these patents discloses use of a single, slidable, untensioned sheet reflector supported by pairs of fibers in contact with opposing surfaces of the sheet. Neither such patent discloses a transparent tubular enclosure that is pressurized to generate the tension in the fibers. Neither discloses a structure which is of comparable light weight or low cost.

SUMMARY OF THE INVENTION

A lightweight solar concentrator of the reflecting parabolic cylinder or trough type is realized via a unique combination of thin reflecting film, an inflatable structural element and tensioned fibers. The reflector element itself is a thin, flexible, specularly-reflecting sheet or film. (Aluminized polyester sheet, for example). It is not self-supporting.

The film is maintained in the parabolic trough shape by means of a plurality of identical tensioned fibers (high strength carbon, for example) arranged to be parallel to the longitudinal axis of the parabola. Fiber ends are terminated in two spaced identical anchorplates, each containing a plurality of holes which lie on the desired parabolic contour.

In the preferred embodiment, these fibers are arrayed in pairs with one fiber directly above the reflecting film and the other immediately behind the reflecting film. The reflective surface is thereby captured between arrays of fibers. The fibers might constrain the membrane by other arrangements. These fibers control shape and position of the reflective membrane.

With increasing number of fibers, a finer approximation to a continuous parabolic figure is enabled along with an increase in the ultimate concentration ratio that can be realized.

The anchorplates are centrally fastened to identical circular endcaps. These endcaps also serve to seal the ends of a transparent thin film cylindrical tube which functions as a housing. The tube may be seamless or may comprise one or more seams which enable the tube to be formed from a flat flexible sheet. Once sealed, raising the pressure of the gas (air) inside the tube increases the stiffness of the tube. This stiffened structure generates tension in the array of fibers. The anchorplates are located relative to the central tube axis so as to impart no tilt-inducing forces on the endplates upon pressurization/tensioning.

Because of the tension, sag or deformation of the array of fibers can be minimized even in the presence of the gravitational load represented by the reflector sheet. As tension is increased, deformation of both fiber and reflector is reduced and the reflector is even further constrained to follow the specific parabolic contour defined by the array of fiber-locating holes.

Thus, the tension resulting from pressurization of the gas inside the cylindrical envelope forces the reflector sheet into the parabolic trough shape enabling a line focus to be created above the reflector. The location of this focal line is determined by the array of holes and the particular parabolic form they follow. In most embodiments the focal line is created inside the transparent cylindrical envelope, including being coincident with the axis of the cylindrical envelope, although it can otherwise be arranged to fall outside the cylinder.

A substantially line-like receiver of the focused concentrated solar direct beam radiation is located at the line focus of the trough reflector. This receiver can be a conduit containing a flowing gas or liquid to which the radiant energy will be transferred and thereby be captured and utilized. Alternatively, a photovoltaic receiver may be located at the position of this focal line for the purpose of converting the radiant energy directly into an electrical form. Alternatively, a hybrid receiver having both thermal and electrical outputs may be placed at this line focus.

Concentrators are fastened to the ground via brackets at the endplates only. The collector design allows a two-axis polar mounting configuration to enable maximum energy collection over the day and the year in any location. Hourly or azimuth sun tracking is accomplished via rotation of the cylindrical collector about the cylindrical axis, while elevation tracking is accomplished via vertical tilting of the collector or array of collectors.

As used herein the terms "string", "fiber" and "wire" are interchangeable and each refers to an elongated substantially non-elastic membrane support member.

As used herein, the terms "reflector film", "membrane" and "reflector" are interchangeable and each refers to an ultra-thin, ultra-light, non-self-supporting member having at least one highly reflective surface.

As used herein the terms "housing", "enclosure", "cylindrical tube", "envelope", "transparent film", are interchangeable and each refers to a transparent cylindrical tubular member that encloses and structurally supports the parabolic membrane.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which.

DETAILED DESCRIPTION OF PREFERRED EMBODIMENTS

Figure 1:
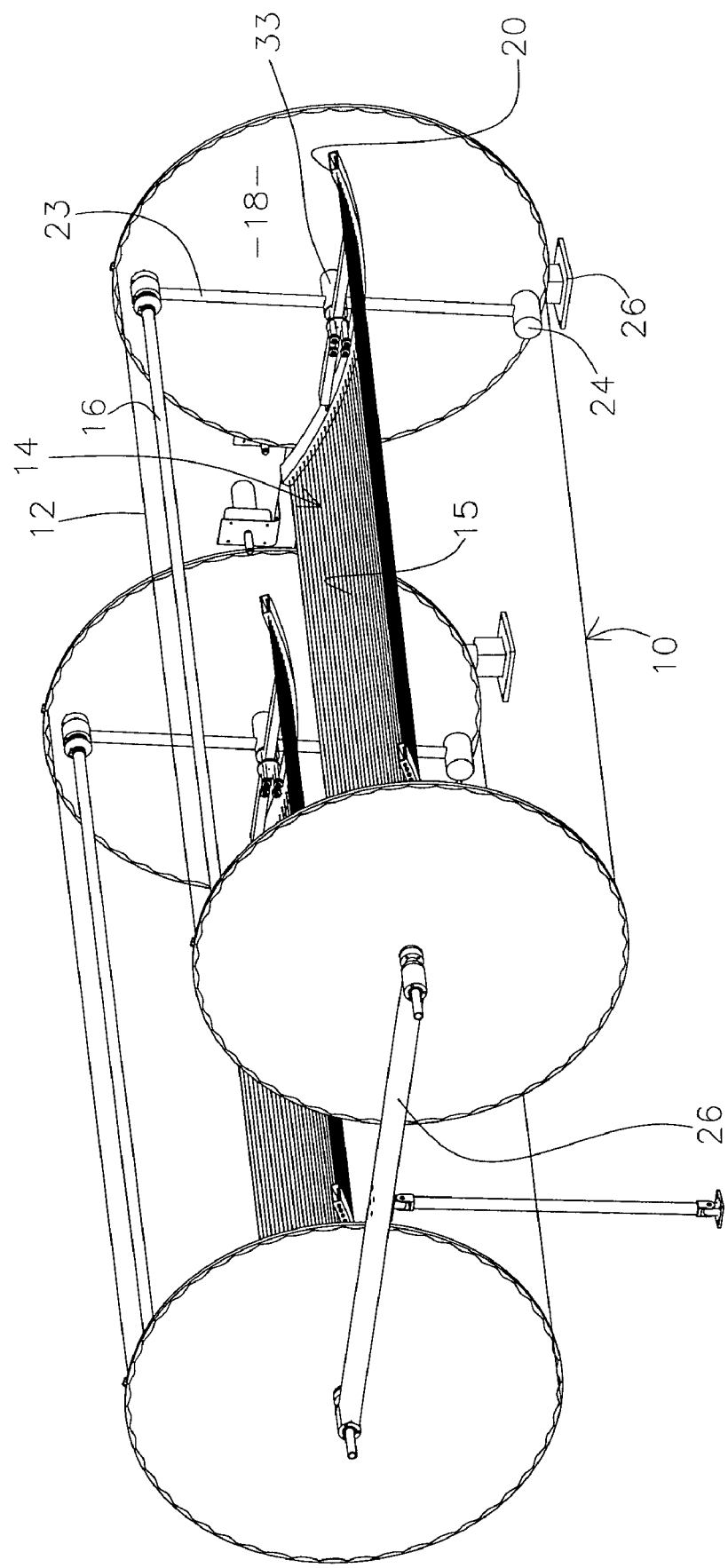
FIG. 1 is a three-dimensional view of a preferred embodiment of the present invention.
Figure 2A:
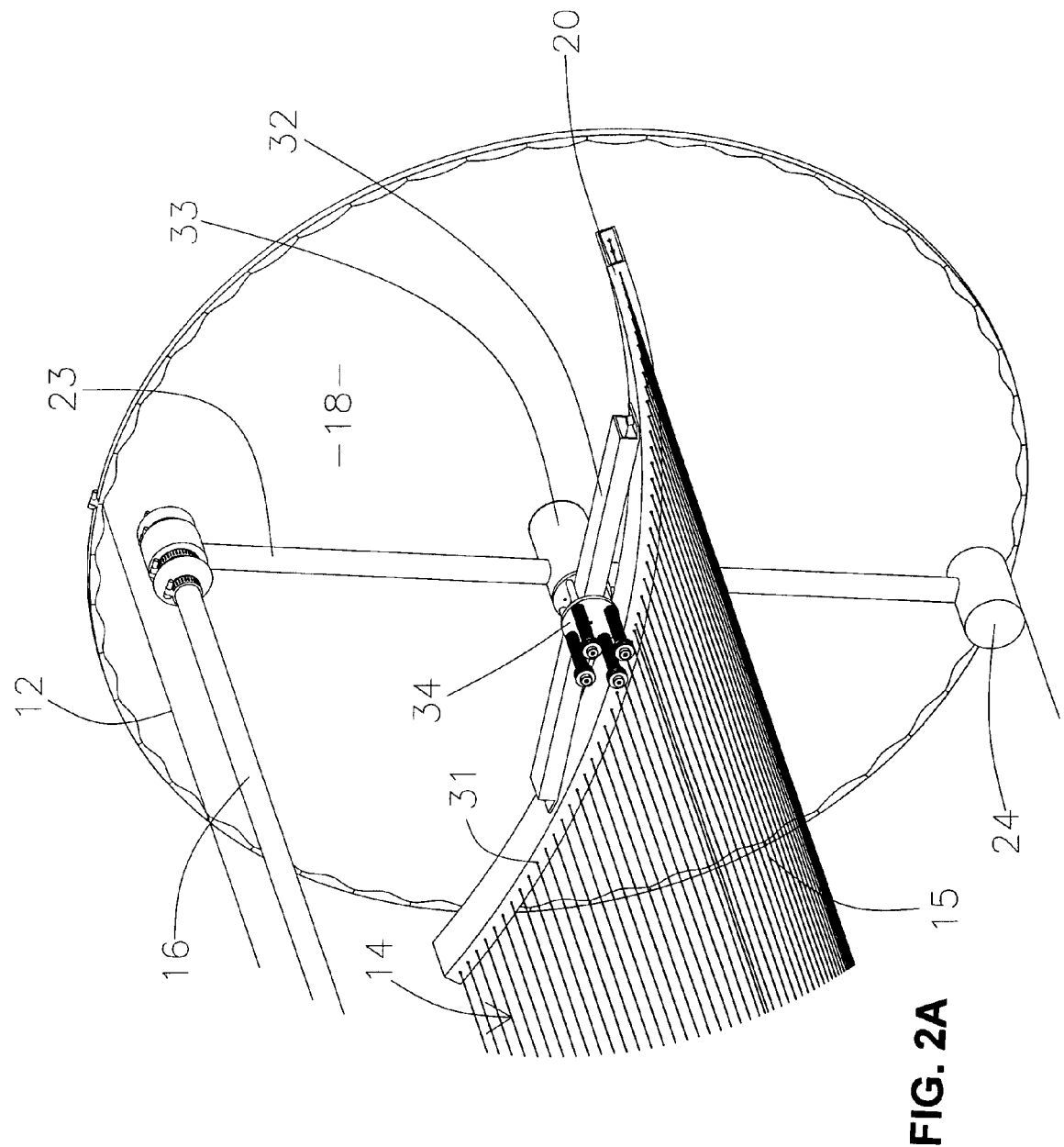
FIG. 2a is an enlarged view of an anchorplate illustrating the string anchoring technique used therein.

Referring to the accompanying figures and initially FIGS. 1 and 2a in particular, it will be seen that a lightweight parabolic trough solar concentrator 10 is shown. Concentrator 10 comprises an inflatable transparent tube 12 terminating at its axial ends in circular endplates 18 each supported at its center by a hub 33. Within tube 12 is a string-supported reflector 14 configured by tensioned strings 15 to form a parabolic shape having a line focus. A receiver 16 is positioned along the line focus of the parabolic reflector and may be configured as a pipe carrying a liquid to be heated by the concentrated sunlight or may be configured as a surface supporting a line array of photovoltaic cells. The ends of the strings 15 terminate in and are secured by an anchorplate 20 at each axial end of the concentrator 10. FIG. 1 shows two concentrators 10 ganged together for joint elevation tracking as well as azimuth sun tracking.

Extending internally along a radius of each endplate 18 is a pipe member 23 connecting receiver 16 to a central hub 33. A counterweight 24 compensates for the weight of receiver 16. Gas pressure within tube 12 causes the endplates 18 to separate the anchorplates and place the strings under tension. The array of holes 31 in each anchorplate 20 follows the desired parabolic form thereby causing the strings 15 and the reflector 14 to form the same parabolic shape. As the gas pressure in the tubular housing 12 increases, the strings become more taut and thus more precisely conform to the desired shape along their entire lengths.

FIG. 2a illustrates an anchorplate 20 in an enlarged view. As shown therein, anchorplate 20 comprises a bent rectangular tube having a plurality of through-holes 31. The holes 31 are arranged along a substantially parabolic curve to receive and secure strings 15. A cross bar 32 is bolted to the anchorplate at two locations and is integral to a hub faceplate 34 which is secured to a central hub 33. Rotation of the endplate 18 will rotate the hub 33, the anchorplate 20, the pipe 23 and the counter-weight 24 along with the receiver 16. The reflector member 14 will also rotate so that its focal line remains coincident with receiver 16.

Figure 2B:
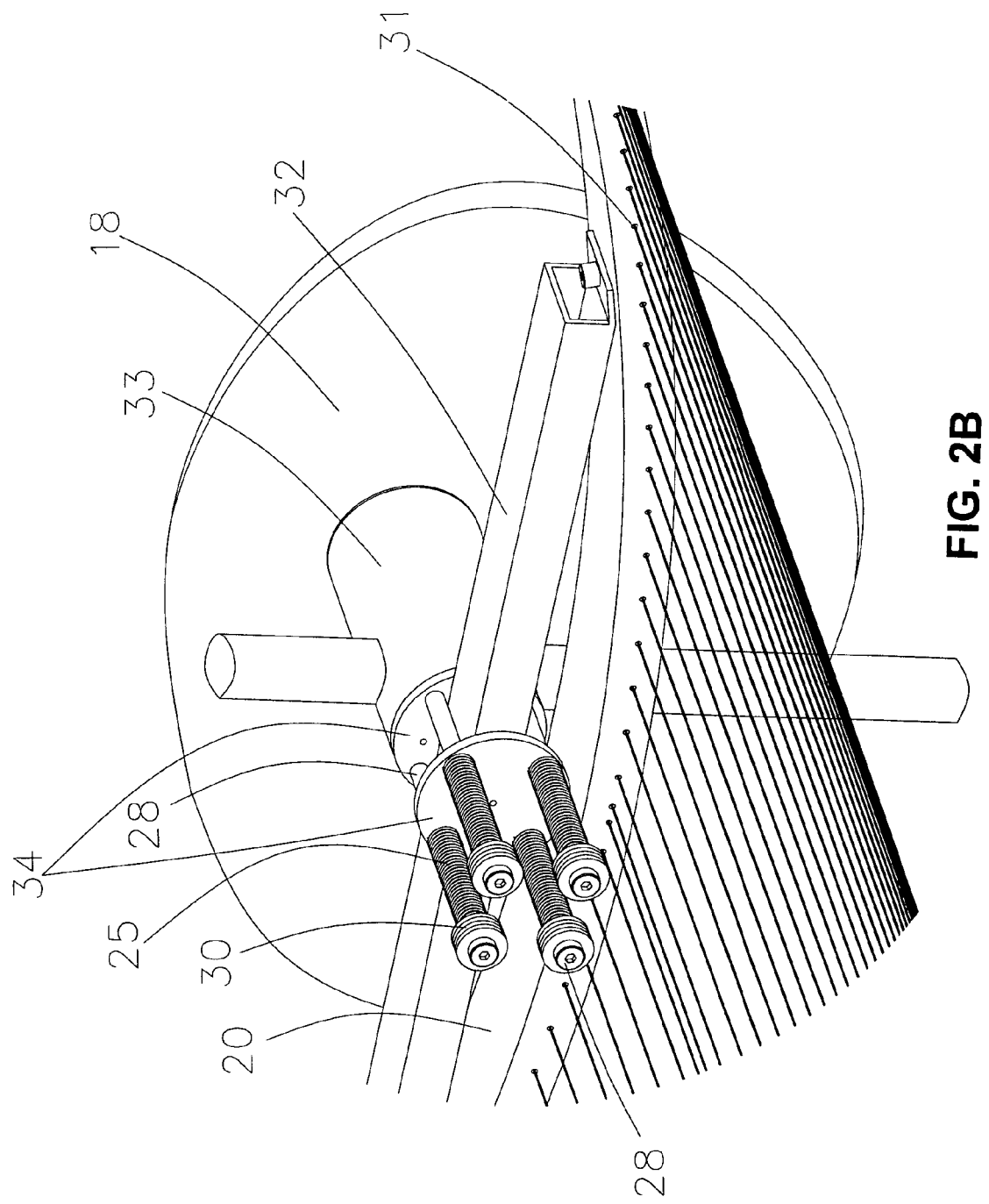
FIG. 2b is an enlarged view of the spring-based interface between the string anchorplate and the hub.
Figure 2C:
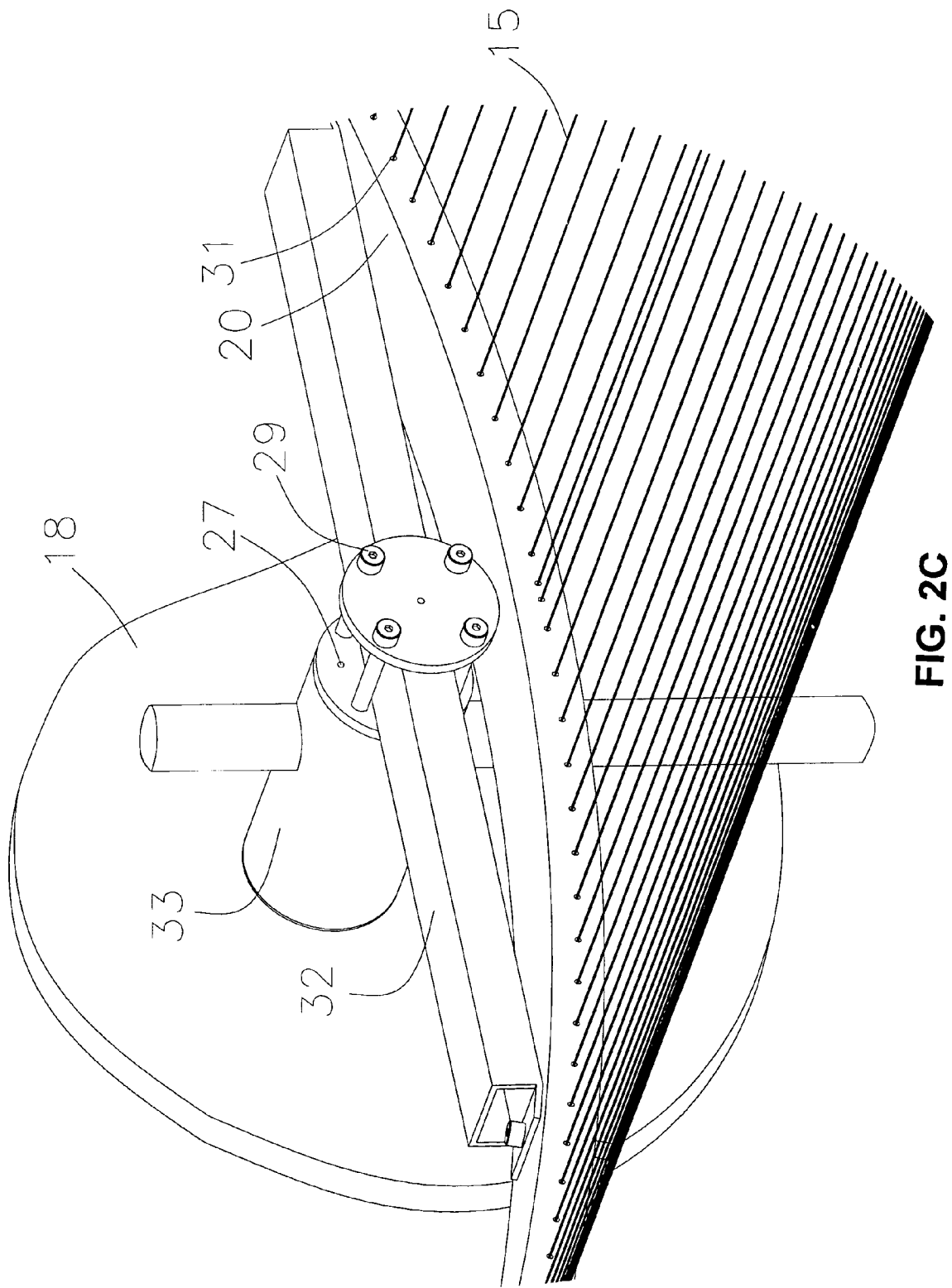
FIG. 2c is a view of a bolted interface between the string anchorplate and the hub.

FIGS. 2b and 2c illustrate two embodiments used to secure the anchorplate 20 to the hub 33. The first embodiment, shown in FIG. 2b utilizes springs to enhance axial compliance between the reflector assembly and transparent tube assembly. As shown therein, four symmetrically located shoulder bolts 28 extend through a pair of spaced anchorplate hubs 34 which are welded to the anchorplate crossbar 32. Each shoulder bolt 28 supports a corresponding helical spring 25 between hub 34 and a retainer 30. This arrangement precisely positions the anchorplate 20 relative to the hub 33 in all directions and rotations except along the hub axis. In the direction of the hub axis, the compliance of the helical springs 25 allow the anchorplate 20 to attain an optimal position relative to the hub 33 for maintaining string tension under a variety of the pressure and thermal loadings.

The second embodiment, shown in FIG. 2c depends upon a flexible endcap 18 to provide axial compliance between the reflector assembly and tube assembly. As shown therein, the anchorplate 20 is attached to the hub 33 via a pinned and bolted joint. The pins 27 precisely position the anchorplate 20 relative to the hub 33 in all directions and rotations. The bolts 29 transfer loads from the anchorplate 20 to the hub 33.

Figure 2D:
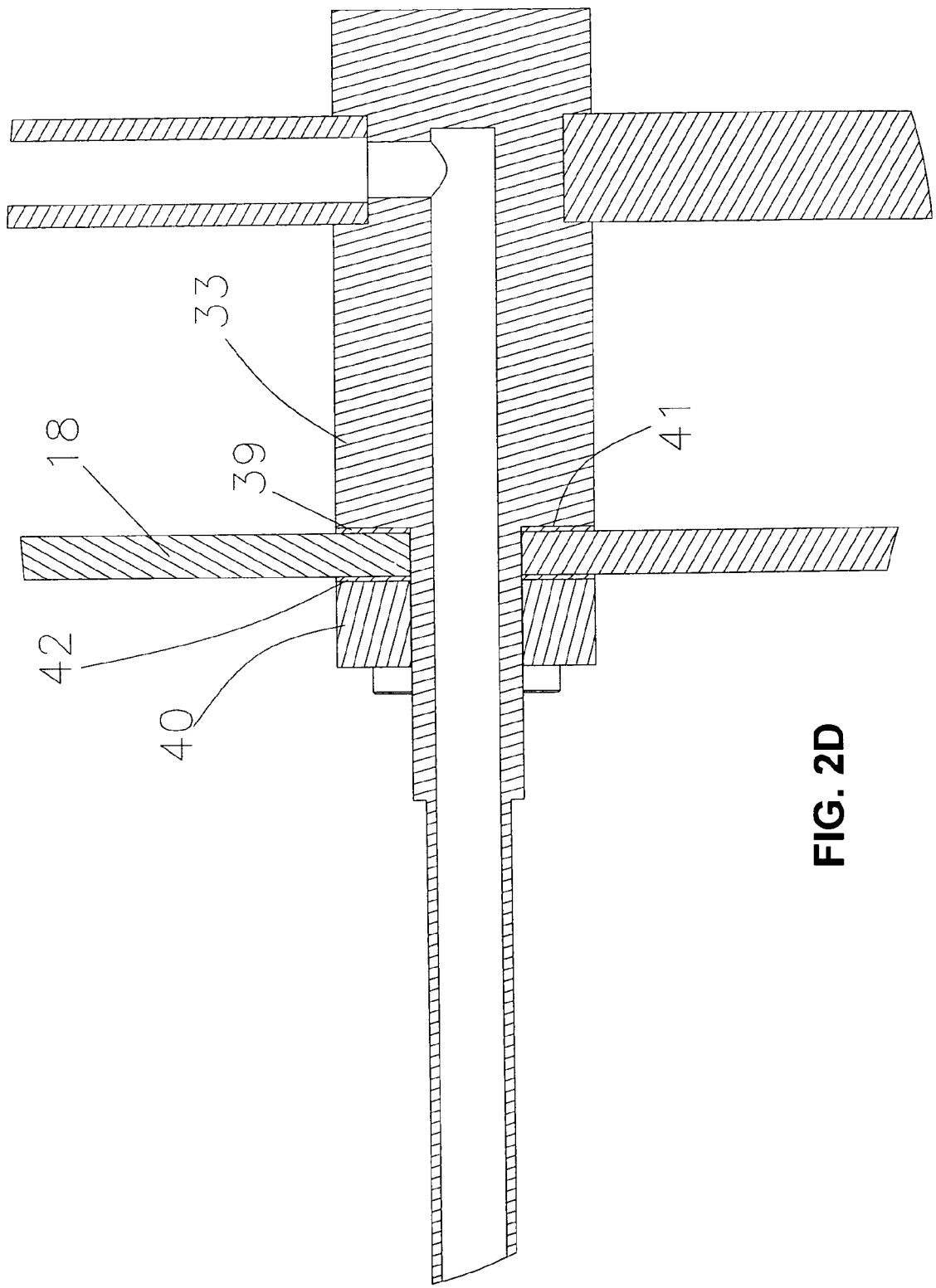
FIG. 2d is a view of the hub from outside the enclosure.
Figure 2E:
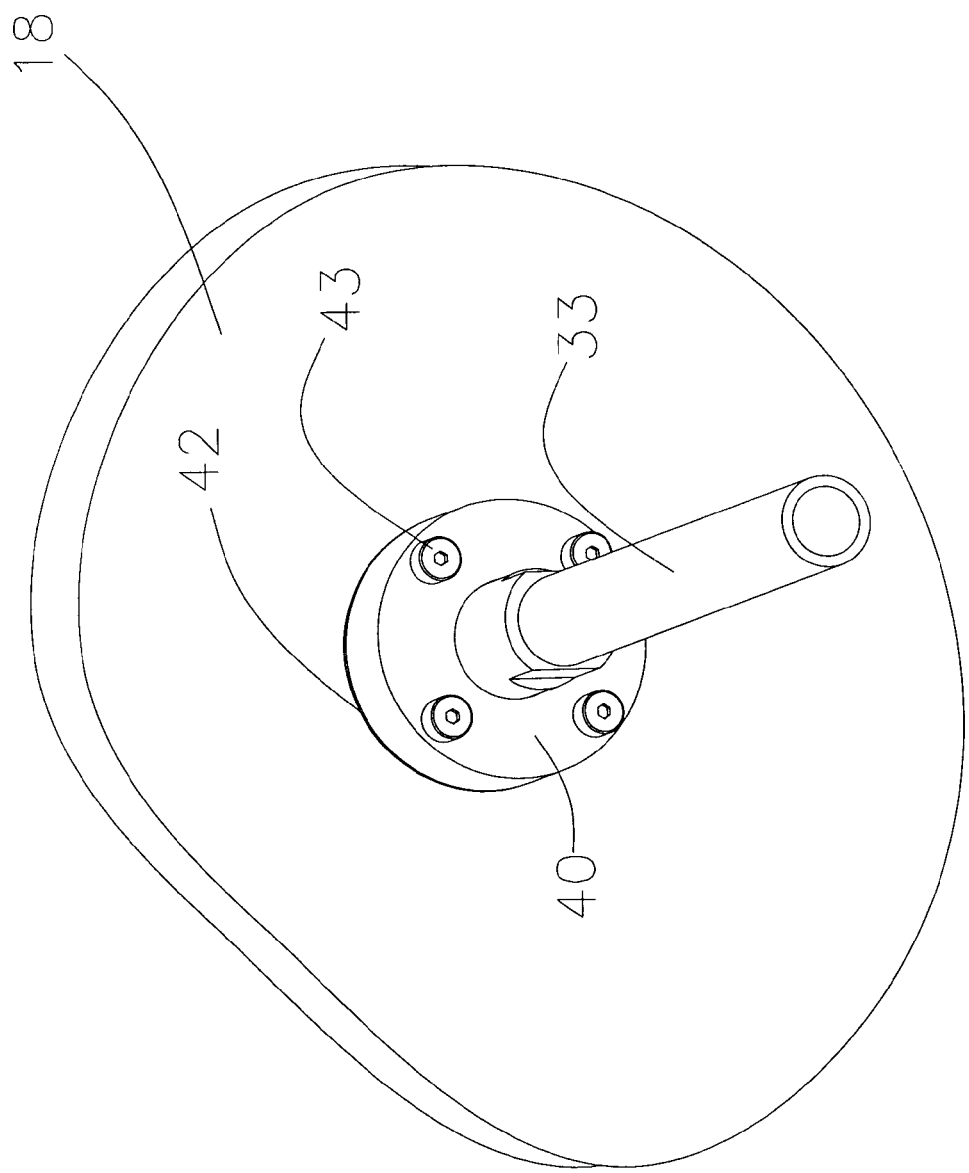
FIG. 2e is a cross section view of the hub and endcap.

FIGS. 2d and 2e illustrate the manner in which the hub 33 is attached and sealed from air leakage to the endplate 18. FIG. 2d provides a cross section view of the hub 33 to endcap 18 interface. As shown therein, the hub 33, is reduced in diameter to provide a shoulder 41 for axial positioning and sealing against the endcap 18. A gasket 39 is provided to ensure the seal and provide a soft interface with the endcap 18. A bolt ring 20 and gasket 42 are located on the outside of the collector enclosure. Bolts 43 secure the bolt ring 40, gaskets 39 and 42 and endplate 18 and against the shoulder 41 of the hub 33 and generate an air tight seal. FIG. 2e provides an isometric view of the hub 33 to endcap 18 interface.

Figure 2F:
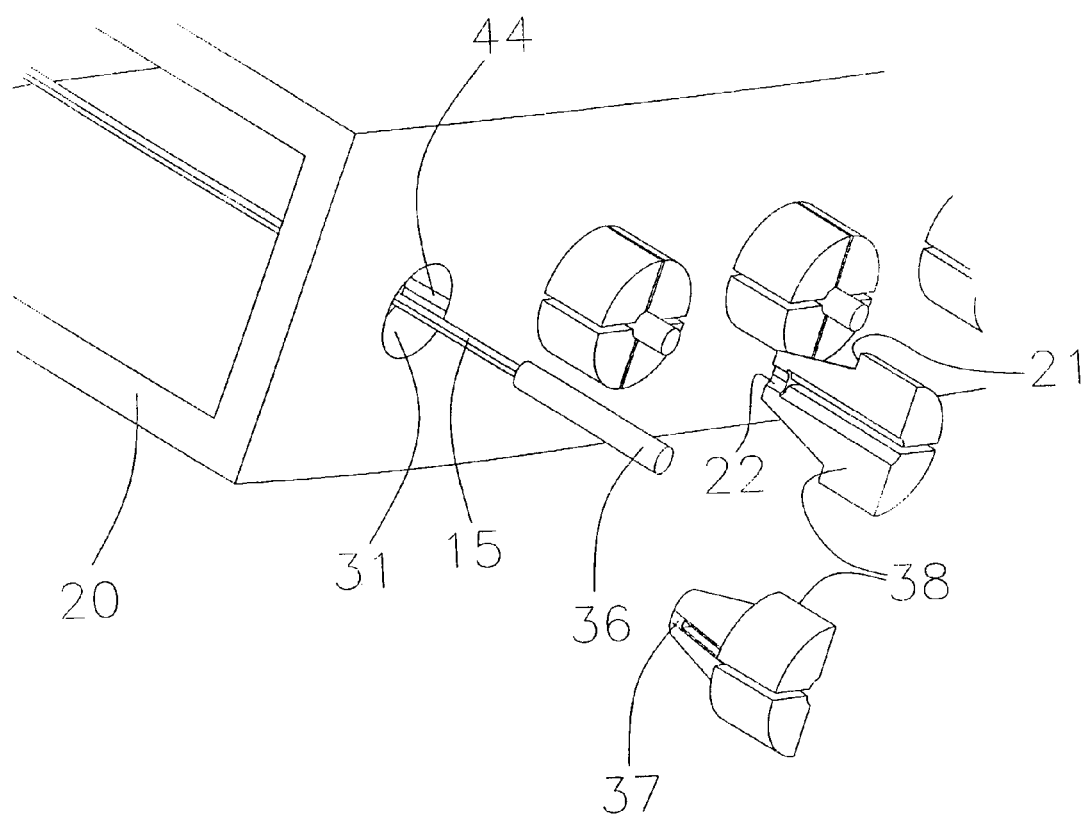
FIG. 2f is an enlarged view showing the retention of the strings into the anchorplate.

FIG. 2f illustrates the manner in which each pair of strings 15 in anchored to anchorplate 20. As shown therein, each such string pair is terminated by a ferrule 36 which is received in a split collect 38 having an internal retaining shoulder 22. A portion of the split collet 38 is tapered to be received and retained in a corresponding tapered hole 31 in the anchorplate. Tapered hole 31 has a flat 44 which in conjunction with a flat 37 on the split collet 38 controls the rotational orientation of the strings. The collet also includes an external shoulder feature for limiting the depth of penetration of the collet into it's corresponding tapered hole 31.

Figure 3:
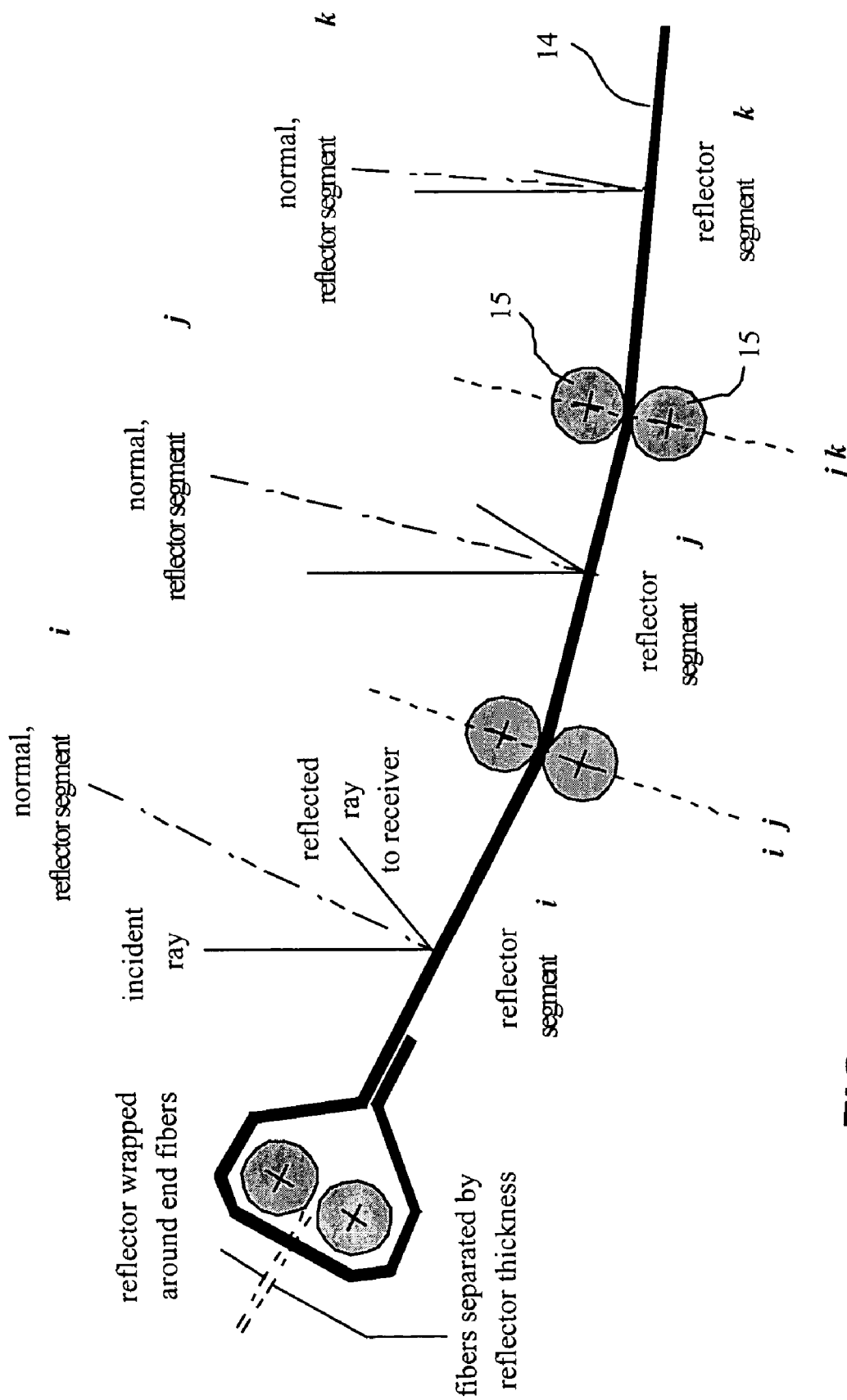
FIG. 3 is a simplified illustration of the preferred string pair film support system.

FIG. 3 illustrates the preferred reflector/string interface wherein string pairs shown in cross-section support the reflector 14 between the strings 15. Each portion of the membrane between respective string pairs comprises an elemental segment reflector. The strings 15 are spaced apart by a gap equal to the thickness of the reflector. The direction of the line between each pair of string centers equals the average of the normals of adjacent segments. Each longitudinal edge of the reflector is wrapped around its corresponding strings as shown in FIG. 3.

Figure 4:
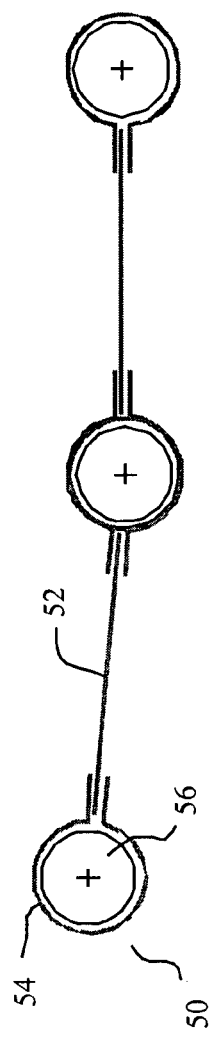
FIGS. 4–6 illustrate a first alternative film supporting technique.
Figure 5:
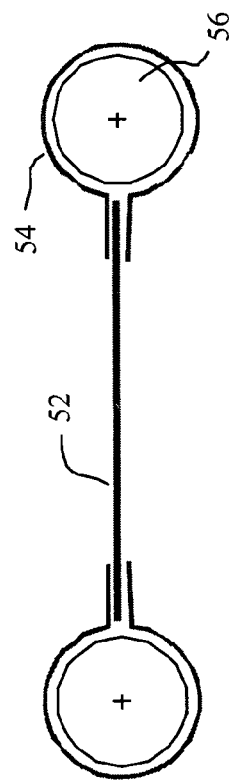
Figure 6:
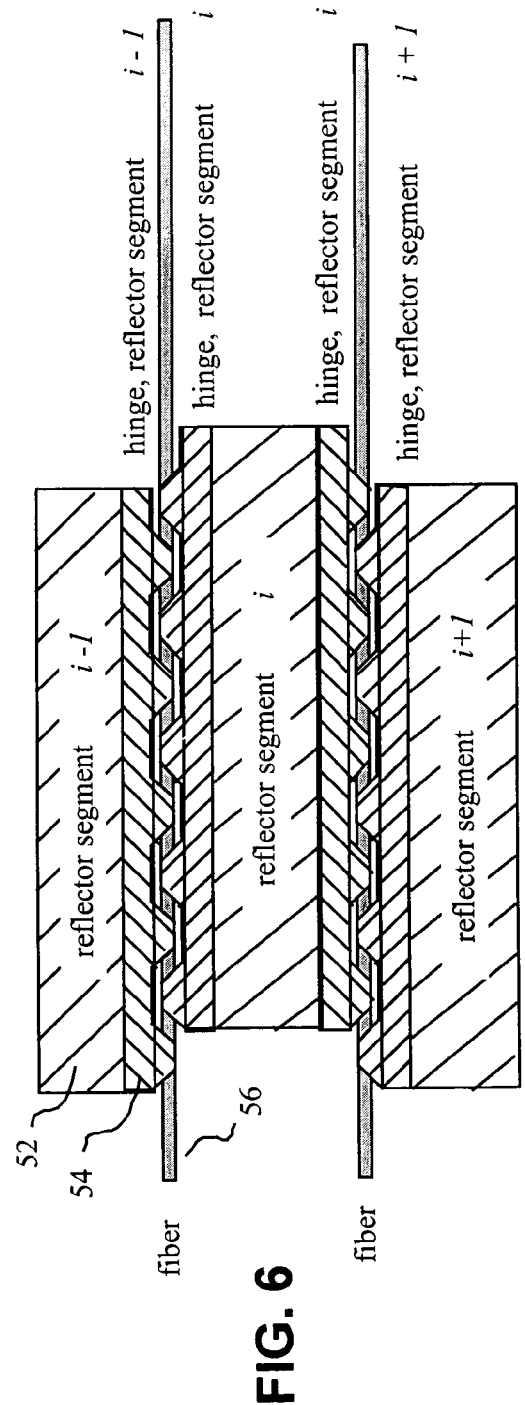

Another embodiment 50 of a reflector/string interface is shown in FIGS. 4 to 6. As shown therein, the reflector 50 comprises a plurality of reflector segments 52, each of which is welded along an edge to a tubular hinge piece 54 which is hingedly attached to a single fiber or string 56. The fibers 56 serve the same purpose as the strings 15 of FIG. 2a, namely to locate and shape the reflective surface.

Figure 7:
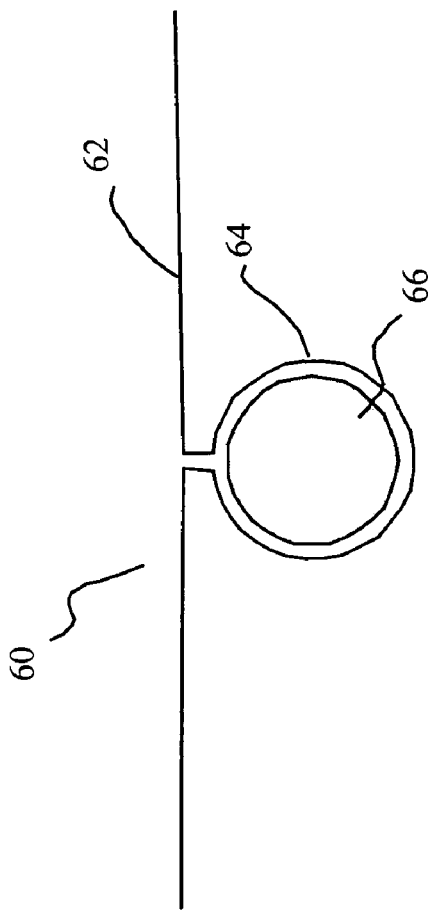
FIGS. 7 and 8 illustrate a second alternative film supporting technique.
Figure 8:
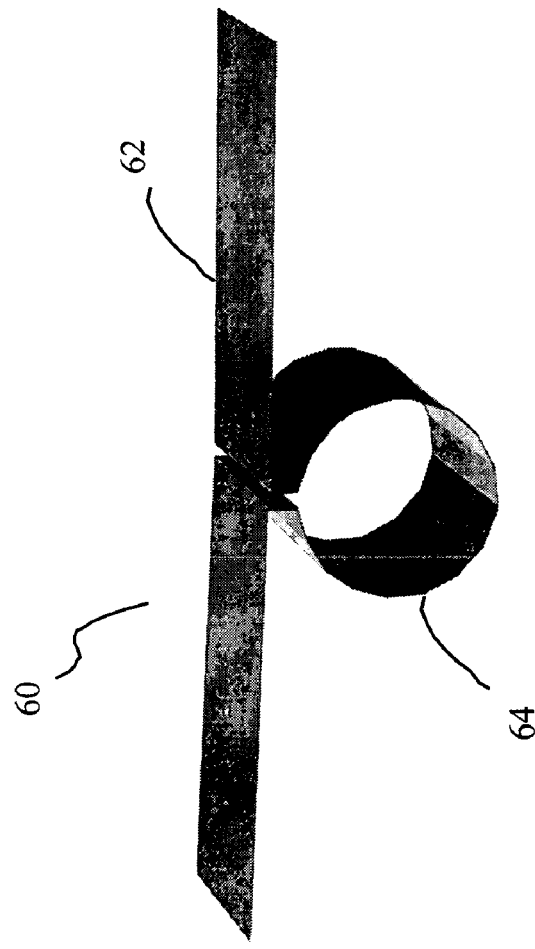

Still another membrane embodiment 60 is shown in FIGS. 7 and 8 wherein a reflective membrane 62 employs an integral backside sleeve 64 through which a single fiber 66 is threaded. Sleeve 64 may be integrally formed by welding the membrane surfaces. In one such embodiment, reflective membrane 62 is about 0.001 inches thick and sleeve 64 is about 0.010 to 0.030 inches in diameter. However, because in this embodiment the sleeves do not obstruct the reflective surface of the membrane, the sleeve diameter can be virtually any practical size.

Figure 11:
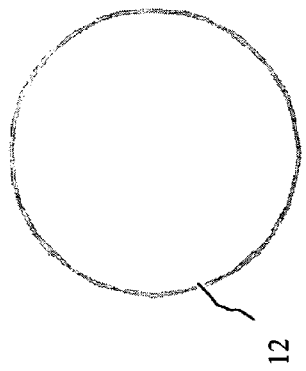
FIGS. 9–13 illustrate the manner in which the tubular housing is secured to the endplates.
Figure 10:
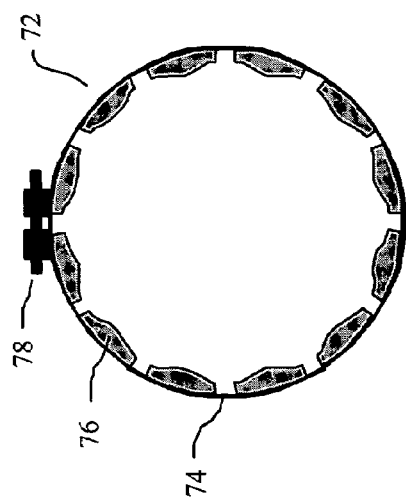
Figure 9:
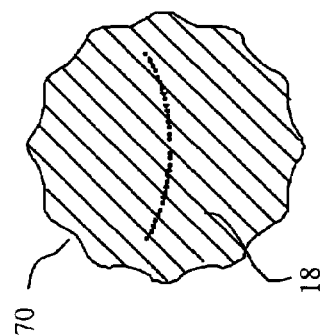
Figure 13:
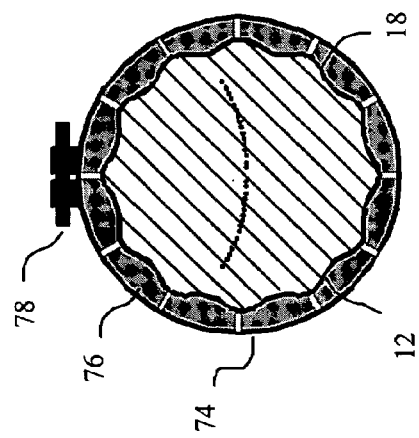
Figure 12:
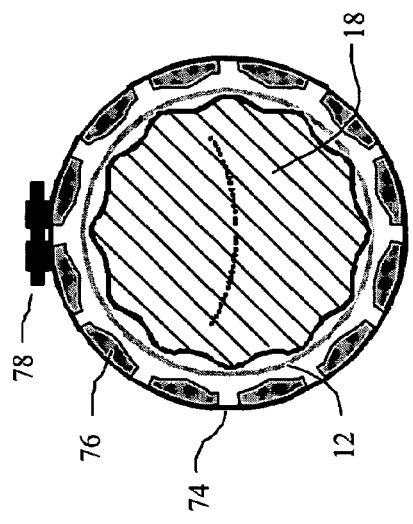

FIGS. 9–13 illustrate the manner in which the tubular housing 12 shown in FIG. 11 is secured to each endplate 18 shown in FIG. 9. As shown therein, the circumferential edge 70 of each end plate has a regular convoluted shape. This edge is surrounded by a ring assembly 72 (see FIG. 10) which comprises a clamping ring 74, a plurality of shoes 76 and a clamp 78. As seen best in FIGS. 12 and 13, the end of tube 12 is positioned and hermetically bound to the endplate edge 70. This is done by tightening clamps 78 until the plurality of shoes 76 engage the tube end and endplate edge. The convolutions cause the tube to be circumferentially stretched to insure a wrinkle-free and hermetic assembly.

Various aspects of the disclosed embodiments have been omitted to avoid obfuscation of the more salient features. By way of example, it will be understood that the inflatable tubular assembly may have one or more sealed seams and a pressure valve. Furthermore, also not shown explicitly is a drive mechanism for slowly rotating the collector assembly to keep the direct beam solar radiation on the receiver as the Earth rotates. Moreover, the ancillary interfaces for the receiver are well known in the art and are also not shown.

Having thus described various embodiments of the present invention, it will now be evident that many modifications and additions are contemplated. Accordingly, the scope hereof is limited only by the appended claims and their equivalents.

We claim:

1. A solar energy concentrator comprising:
a tubular housing having opposed ends;
a pair of opposed endplates sealing said housing; and;
a parabolic contoured reflective surface extending within said housing; said endplates having a convoluted circumferential edge, said tubular housing being hermetically secured at said ends in compression against said edge.

2. The solar concentrator recited in claim 1 further comprising a ring assembly having a plurality of shoes and a clamp for compressing said ends of said housing against said convoluted edges of said endplates.

3. The solar concentrator recited in claim 1 wherein said parabolic contoured reflective surface has a unitary line of focus.

4. The solar concentrator recited in claim 1 wherein said parabolic contoured reflective surface is shaped by a plurality of strings extending within said tubular housing.

5. The solar concentrator recited in claim 4 wherein said strings are in a state of tension.

6. The solar concentrator recited in claim 1 wherein said parabolic contoured reflective surface is shaped by a plurality of string pairs, each such pair having a string on front and back surfaces of said reflective surface.

7. The solar concentrator recited in claim 6 wherein said strings are in a state of tension.

8. The solar concentrator recited in claim 1 wherein said housing is internally pressurized above external atmospheric pressure by a gas within said housing.

9. The solar concentrator recited in claim 1 wherein said parabolic contoured reflective surface is shaped by constrained elongated fibers intimate with said reflective surface and said fibers are subjected to tension to constrain said reflective surface in said parabolic cross-section.

10. The solar concentrator recited in claim 9 wherein a gas inside said housing is under pressure and wherein said pressure at least partially contributes to said tension of said fibers.

11. The solar concentrator recited in claim 1 wherein said reflective surface comprises metallized Mylar and wherein said strings comprise carbon fiber.

12. The solar concentrator recited in claim 3 further comprising a solar energy receiver extending along at least a portion of said line focus.

13. The solar concentrator recited in claim 1 further comprising means for rotating said housing to control the orientation of said reflector relative to incident sunlight.

14. The solar concentrator recited in claim 4 wherein said strings are formed within sleeves on the back side of said reflector.

15. The solar concentrator recited in claim 4 wherein said reflective surface is slidably received by said strings without any significant tension being applied to said membrane.

16. The solar concentrator recited in claim 1 wherein at least one endplate comprises an axially flexible material.

* * * * *